United States Patent [19]
Proulx

[11] Patent Number: 5,020,567
[45] Date of Patent: Jun. 4, 1991

[54] DRAINAGE VALVE HAVING A FLEXIBLE FLAP WITH AN EDGE TAPER

[75] Inventor: Serge L. Proulx, St-Rédempteur-de-Vaudreuil, Canada

[73] Assignee: Innotag Inc., Montreal, Canada

[21] Appl. No.: 588,174

[22] Filed: Sep. 26, 1990

[51] Int. Cl.$^5$ .............. F16K 43/00; F16K 31/20; F16K 33/00
[52] U.S. Cl. .................. 137/315; 137/448; 137/451; 137/625.28; 251/175; 251/294; 251/299; 251/901; 405/37; 405/39; 405/96
[58] Field of Search .......... 137/315, 448, 451, 625.28, 137/625.3, 855; 251/157, 175, 228, 294, 298, 299, 901; 405/37, 39, 40, 90, 91, 96, 97, 98

[56] References Cited

U.S. PATENT DOCUMENTS

| | | | |
|---|---|---|---|
| 297,643 | 4/1884 | Stark | 251/299 |
| 2,180,173 | 11/1939 | Share | 251/901 |
| 2,216,000 | 9/1940 | Crawford | 251/901 |
| 2,675,025 | 4/1954 | Wynkoop | 251/901 |
| 3,259,142 | 7/1966 | Richards | 137/451 |
| 3,951,168 | 4/1976 | Roberts | 251/901 |
| 3,998,571 | 12/1976 | Falke | 137/855 |
| 4,084,617 | 4/1978 | Happe | 251/901 |
| 4,111,228 | 9/1978 | Simionescu | 137/855 |
| 4,147,183 | 4/1979 | Kalsi | 137/625.28 |
| 4,621,945 | 11/1986 | Schafer et al. | 405/39 |

Primary Examiner—George L. Walton
Attorney, Agent, or Firm—James R. Longacre; John M. White

[57] ABSTRACT

A valve is installed into an underground conduit to control drainage of water through that conduit. The drainage control valve includes a perforated plate across the conduit. The latter plate is formed with a peripheral groove rectangular in cross section and a hollow tube made of flexible material is inserted into this groove to seal the joint between the plate and the inner surface of the conduit. A flap also made of flexible material is applied against the upstream surface of the plate and is formed with a peripheral edge taper whereby pressure applied on the flap by water upstream of the drainage valve forces the edge taper against the upstream plate surface to form a sealed joint between these flap and plate. The upper portion of the flap is attached to the upper portion of the plate through screw and nut assemblies. These assemblies traverse rigid washers inserted in respective holes made in the flap. The flap is slightly thicker than the washers for preventing excessive crushing of the flexible material upon tightening of the screw and nut assemblies while ensuring water imperviousness. An elongated member integral with the flap has a free end formed with a hole to attach a cord enabling lifting of the lower portion of the flap to thereby drain water through the perforated plate.

17 Claims, 3 Drawing Sheets

DRAINAGE VALVE HAVING A FLEXIBLE FLAP WITH AN EDGE TAPER

BACKGROUND OF THE INVENTION

1. Field of the invention:

The present invention relates to a drainage valve for installation into a water draining conduit. In accordance with the invention, this valve comprises a flexible flap formed with an edge taper to improve water imperviousness.

2. Brief description of the prior art;

U.S. Pat. No. 4,621,945 granted to Schafer et al. on Nov. 11, 1986, illustrates and describes a drainage valve of the above type for installation into an underground water draining conduit. The valve of Schafer et al. comprises a perforated plate on the upstream surface of which is applied a flexible flap. The upper -portion of the flap is attached to the upper portion of the perforated plate through screw and nut assemblies. The lower portion of the flap can be lifted by means of a cord extending into a riser pipe and fixed to the lower flap portion through a bracket. A block element attachable to a pole member is also secured to the upper portions of the flap and plate through the above mentioned screw and nut assemblies to enable installation of the valve into the underground draining conduit from the surface of the ground through the riser pipe.

The drainage valve of Schafer et al. presents the following drawbacks:

the flap is of even thickness over its entire surface; this results in a lack of imperviousness between the plate and flap as the pressure applied on the flap as water upstream of the valve is not sufficient to produce a tight joint by forcing the periphery of the flap on the upstream surface of the perforated plate;

the 0-ring placed between the plate and an inner flange of the underground water draining conduit can cause leakage of water through the valve;

the bracket fixed to the lower portion of the flap requires special cutting out of the plate which often causes water leakage through the valve; and the block element is in the form of a parallelepiped and comprises exposed acute edges which can cause obstruction upon lifting of the lower portion of the flap through the cord attached to the bracket.

OBJECT OF THE INVENTION

An object of the invention is therefore to provide a drainage valve for installation into a water draining conduit eliminates the above mentioned drawbacks of the prior art.

SUMMARY OF THE INVENTION

More specifically, in accordance with the present invention, there is provided a drainage valve for installation into a water draining conduit, comprising (a) a plate provided with apertures therein to enable water to flow through this plate defining an upstream surface, (b) means for mounting the plate within the water draining conduit with the plate extending across the conduit, these plate mounting means including means for sealing a peripheral joint between the plate and an inner surface of the conduit, (c) a flap made of flexible material and applied against the upstream surface of the plate, which flap comprising an upper portion, a lower portion, and a peripheral edge taper encompassing the apertures of the plate whereby pressure applied on the flap by water upstream of the drainage valve forces the edge taper against the upstream surface of the plate to form a peripheral, sealed joint between these flap and plate, (d) means for attaching the upper portion of the flap to a corresponding upper portion of the plate, and (e) means for lifting the lower portion of the flap to drain water upstream of the drainage valve through the apertures of the plate.

As the edge of the flap is tapered, it has an increased flexibility and accordingly less water pressure is required to force it against the upstream surface of the flap and produce a peripheral, tight joint.

In accordance with a preferred embodiment of the invention, the flap comprises an integral elongated bracket member having a first end connected to the lower portion of the flap on the upstream surface of this flap and a second free end with a hole therein. As this bracket member is integral with the flap, it requires no cutting out of the plate which can eventually cause water leakage through the drainage valve.

Advantageously, the above mentioned joint sealing means comprises the plate formed with a peripheral groove rectangular in cross section and a hollow tube inserted into that groove and made of flexible material such as pure gum rubber or other synthetic or natural material having similar properties, and the plate mounting means comprises spring clips peripherallY distributed on a downstream surface of the plate and capable of clamping an annular, inner flange of the water draining conduit to press the hollow tube between the groove and the inner flange. When pressed by the clips between the groove and the inner flange, the hollow tube eliminates any water leakage through the point between the plate and conduit.

According to another preferred embodiment of the present invention, the drainage valve comprises a block element removably attachable to a pole member and fixed on an upstream surface of the upper portion of the flap to enable installation of the drainage valve through a riser pipe section connected to the water draining conduit. This block element has the form of a parallelepiped and comprises rounded edges to prevent the said block element to cause obstruction upon lifting of the lower portion of the flap through a cord attached to the lower flap portion and extending in the riser pipe section.

The means for attaching the upper portion of the flap to the upper portion of the plate may comprise screw and nut assemblies traversing both the flap and the plate, and washer elements made of rigid material and disposed in respective holes of the flap. Each washer element is traversed by a respective screw of said assemblies to prevent crushing of the flexible material of the flap upon tightening of the screw and nut assemblies.

The objects, advantages and other features of the present invention will become more apparent upon reading of the following non restrictive description of a preferred embodiment thereof, given by way of example only with reference to the accompanying drawings.

DETAILED DESCRIPTION OF THE PREFERRED EMBODIMENT

Figure 4:
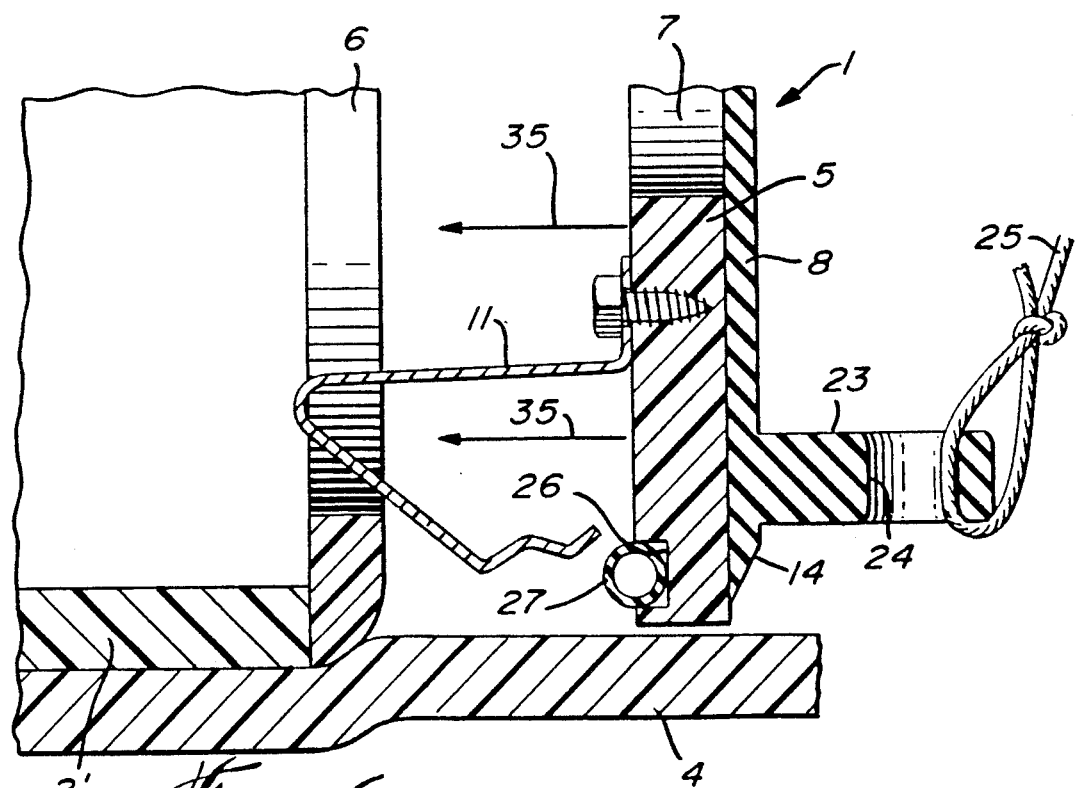
FIG. 4, which is disposed on the same sheet of formal drawings as FIG. 1, is an enlarged, cross sectional view of the lower portion of the drainage valve of FIG. 3, showing movement of this valve upon installation thereof.

Referring now to the appended drawings, the drainage valve in accordance with the present invention is generally identified by the reference numeral 1 and is installed into an underground and cylindrical water draining conduit 2 through a riser pipe 3 having a lower end connected to the conduit 2 through a T-shaped junction 4 and an upper end emerging from the ground. Interposed between the junction 4 and the proximate end of the conduit section 2' is a ring defining in the conduit 2 an annular flange 6 (FIG. 4). The inner surface of the conduit 2 therefore presents an annular flange 6 positioned close to the riser pipe 3.

As illustrated, the drainage valve 1 comprises a plate 5 with apertures such as 7 therein, a flap 8 applied on the upstream surface of the plate 5, three spring clips 9, 10 and 11 mounted on the downstream surface of the plate 5, and a block element 12 removably attachable to a pole member 13 (FIG. 3) in order to install the valve 1 in the conduit 2 from the surface of the ground through the riser pipe.

The flap 8 is made of pure gum rubber or of any other synthetic or natural material having similar properties. It is accordingly very flexible. The flap 8 presents a peripheral edge taper 14 making the periphery of this flap more flexible. One can appreciate that less pressure applied on the flap 8 by water upstream of the valve 1 is required to force the edge taper 14 against the upstream surface of the plate 5 to produce a peripheral, tight joint between these flap and plate. The flexibility of the edge taper 14 is important to seal the joint between the flap 8 and the plate 5 in particular when the level of water in the conduit 2 upstream the valve 1 is lower than the the height of this valve.

Figure 3:
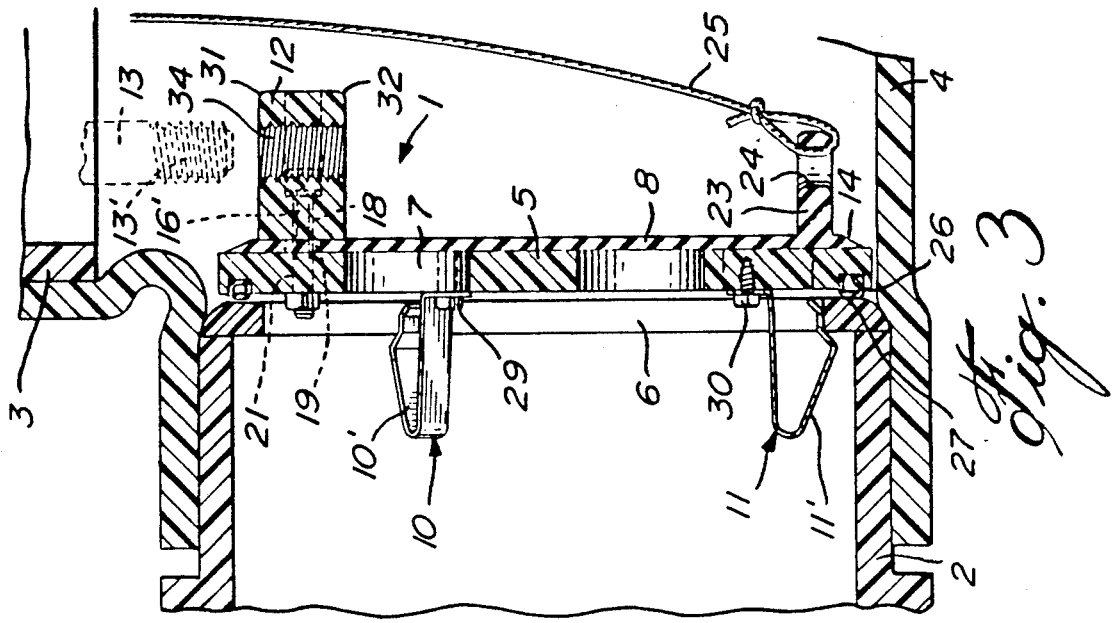
FIG. 3 is a cross sectional view, taken along axis A—A of FIG. 2, of the drainage valve of FIGS. 1 and 2 installed in a water draining conduit.

As can be seen in particular in FIG. 3, the diameter of the flap 8 is substantially the same as the diameter of the plate 5 whereby the apertures 7 are encompassed by the edge taper 14.

Figure 2:
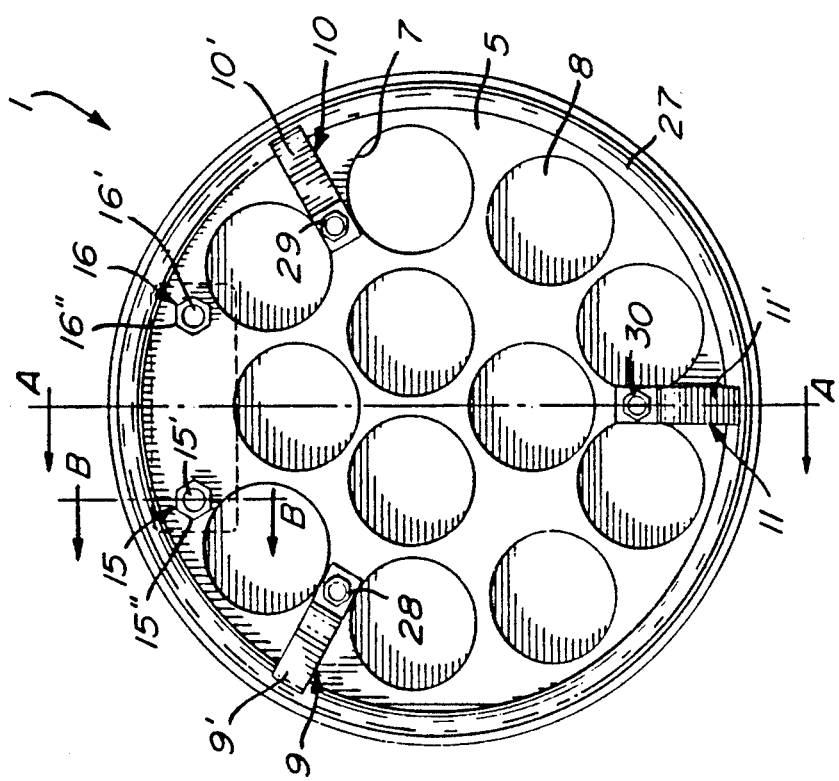
FIG. 2 is a rear view of the drainage valve of Figure showing in particular the disposition of the spring clips.
Figure 5:
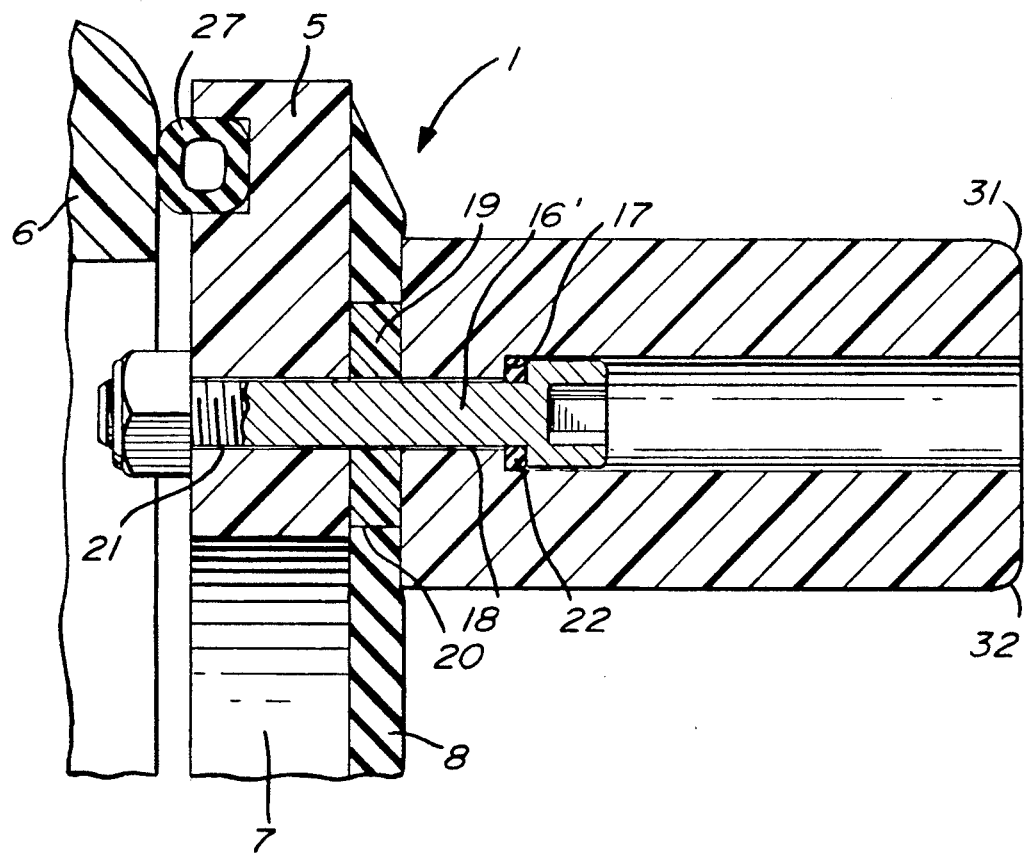
FIG. 5 is an enlarged, cross sectional view of the upper portion of the drainage valve of FIGS. 1, 2 and 3, taken along axis B—B of FIG. 2.

The upper portion of the flap 8 is secured to the upper portion of the plate 5 through a pair of screw and nut assemblies 15 and 16 made of stainless steel. More specifically, the flap 8 is pressed by the assemblies 15 and 16 between the plate 5 and the block element 12. The heads of the screws 15' and 16' abut against shoulders such as 17 (FIG. 5) formed in holes such as 18 of the element 12. The heads of these two screws therefore penetrate the material of the block element 12 to cause no obstruction upon lifting of the lower portion of the flap 8 as will become apparent from the following description. The screws 15' and 16' then pass through respective washer elements such as 19 (FIG. 5) made of rigid plastic material and inserted into holes such as 20 in the upper portion of the flap 8, and through respective holes such as 21 in the plate 5. Lock nuts 15" and 16" (FIG. 2) are then screwed on the threaded ends of the screws 15' and 16' emerging from the downstream surface of the plate 5.

O-rings such as 22 made for example of rubber material are respectively crushed between the heads of the screws 15'→ and 16' and the shoulders such as 17 to ensure imperviousness of the point between these screw heads and the block element 12.

The rigid washer elements such as 19 are somewhat thinner than the flap 8; the latter flap is approximately 0.010-0.020 inch thicker than the washer elements 19. The function of the elements 19 is to prevent crushing of the flap 8 when the screw and nut assemblies 15 and 16 are tightened by screwing the nuts 15" and 16", which crushing can cause tilting of the flap 8 and lack of imperviousness to water of the valve The flap 8 is however sufficiently pressed to ensure imperviousness between the flap 8 and the block element 12 and between the flap 8 and the plate 5.

An elongated bracket member 23 (FIGS. 3 and 4) is integrally formed onto the upstream surface of the lower portion of the flap 8. This elongated member 23 is therefore made of the same flexible material as the flap 8 and has a first end connected to the latter flap and a second free end provided with a hole 24 to attach a cord 25 permitting to lift the lower portion of the flap 8 when water upstream of the valve is to be drained. This integrally formed bracket member requires no special cutting out in the plate 5 which can cause leakage of water through the valve 1.

The plate is made of PVC (polyvinyl chloride), grade 1, type 1. It comprises apertures 7 encompassed by the edge taper 14 of the flap 8 and positioned to enable mounting of the three spring clips 9, 10 and 11 thereon. It should be pointed out here that the edge taper 14 enables provision of a greater number of apertures 7 through the plate 5 as it produces a tighter joint between the flap 8 and the periphery of the downstream surface of the plate 5.

The downstream surface of the plate is also formed with a peripheral groove 26 generally rectangular in cross section. Inserted into this groove 26 is a sealing hollow tube 27 made of pure gum rubber or of any other synthetic or natural material having similar properties.

The three spring clips 9, 10 and 11 are 120 degrees apart and are distributed over the periphery of the downstream surface of the plate 5. These clips are V-shaped and are made of spring stainless steel. They are fixed to the plate through screws 28, 29 and 30, respectively, and comprise outer arms 9', 10' and 11' with a zigzag free end to clamp the inner flange 6 of the conduit 2. When they clamp the flange 6, the clips 9, 10 and 11 press the hollow tube 27 between the groove 26 and this flange 6. Due to the distribution of the clips 9, 10 and 11, a substantially uniform pressure is applied over the length of the tube 27. As can be appreciated by one skilled in the art, the rectangular groove 26 and the hollow tube 27 can produce a very tight joint with a relatively low pressure applied on the tube 27.

Figure 1:
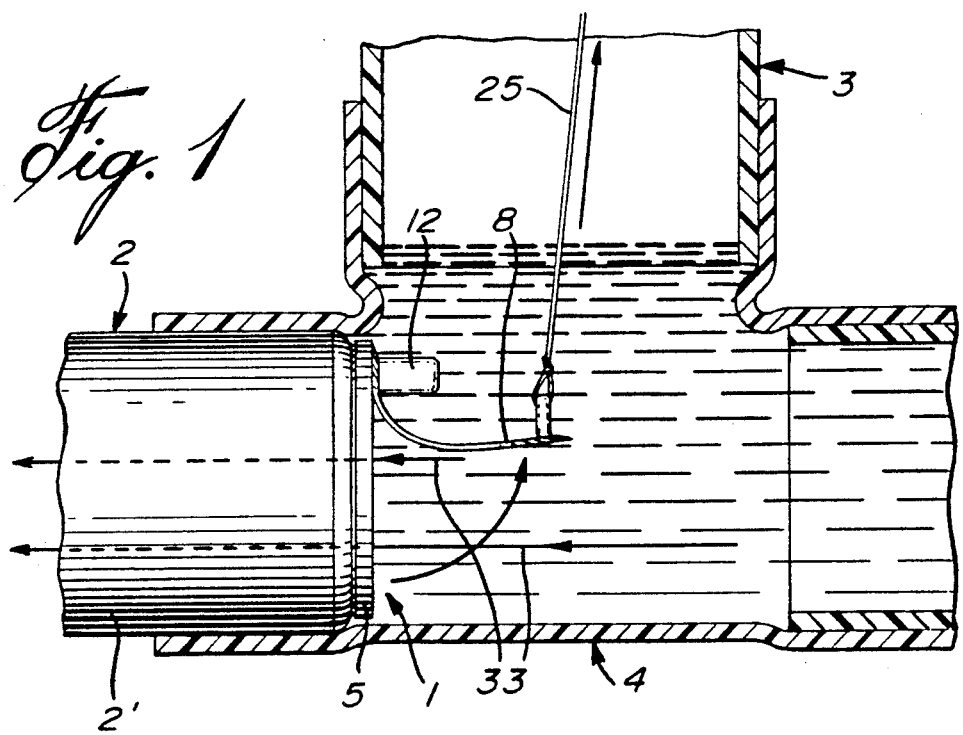
FIG. 1 is a side elevation view, partially cross sectional, of an embodiment of the drainage valve in accordance with the present invention for installation into a water draining conduit.

The block element 12 has the form of a parallelepiped and its exposed edges such as 31 and 32 (FIG. 3) are rounded to cause no obtruction upon lifting of the lower portion of the flap 8 to drain water through the apertures 7 of the plate 5 as shown by the arrows 33 (FIG. 1). Indeed, the cord 25 and bracket member 23 can slide on these rounded edges 31 and 32. The upper end of the cord 25 can for example be attached to a float (not shown) disposed into the riser pipe 3 and responsive to the level of the underground water table to lift the lower portion of the flap 8.

The block element 12 also comprises a threaded vertical hole 34 in which the pole member 13 with a threaded end 13' can be screwed to enable installation of the Valve 1 from the surface of the ground through the riser pipe 3. To install the valve 1, it should be moved in the direction 35 (FIG. 4) until the clips 9, 10 and 11 clamp the flange 6. The pole member 13 is then unscrewed and removed and the valve 1 operated through the cord 25. When the valve 1 should be removed for example for maintenance purposes, the pole member 13 is screwed in the hole 34 and using this pole member 13, the clips 9, 10 and 11 are disengaged from the inner flange 6 and the valve 1 removed through the riser pipe 3.

Although the present invention has been described hereinabove by way of a preferred embodiment thereof, such an embodiment can be modified at will, within the scope of the appended claims, without departing from the spirit and nature of the subject invention.

What is claimed is:

1. A drainage valve for installation into a water draining conduit, comprising
a plate provided with apertures therein to enable water to flow through the said plate, said plate having an upstream surface;
means for mounting the plate within the water draining conduit with the said plate extending across the said conduit, said plate mounting means including means for sealing a peripheral joint between the plate and an inner surface of the conduit;
a flap made of flexible material and applied against the upstream surface of the plate, said flap comprising an portion, a lower portion, and a peripheral portion encompassing the apertures of the plate the peripheral portion having a thickness which tapers toward a peripheral edge of the flap so that the peripheral portion has an increased flexibility, whereby pressure applied on the flap by water upstream of the drainage valve forces the tapered peripheral portion against the upstream surface of the plate to form a peripheral, sealed joint between the said flap and plate;
means for attaching the upper portion of the flap to a corresponding upper portion of the plate; and
means for lifting the lower portion of the flap to drain water upstream of the drainage valve through the apertures of the plate.

2. The drainage valve of claim 1, in which the flap comprises a downstream surface applied on the upstream surface of the plate and an upstream surface opposite to the said downstream surface and having a periphery converging with the latter downstream surface to define the said taper.

3. The drainage valve of claim 1, wherein the said flap is made of pure gum rubber.

4. The drainage valve of claim 1, in which the said lifting means comprises bracket means fixed on the lower portion of the flap on an upstream surface of said flap, said bracket means being made of said flexible material and being integral with the said flap.

5. The drainage valve of claim 4, further comprising a block element removably attachable to a pole member and fixed on an upstream surface of the upper portion of the flap to enable installation of the drainage valve through a riser pipe section connected to the water draining conduit, said block element having the form of a parallelepiped and comprising rounded edges to prevent said block element to cause obstruction upon lifting of the lower portion of the flap through a cord attached to said bracket means and extending in the riser pipe section.

6. The drainage valve of claim 4, wherein the said bracket means comprises an elongated member having a first end connected to the lower portion of the flap and a second free end with a hole therein.

7. The drainage valve of claim 6, further comprising a block element removably attachable to a pole member and fixed on an upstream surface of the upper portion of the flap to enable installation of the drainage valve through a riser pipe section connected to the water draining conduit, said block element having the form of a parallelepiped and comprising rounded edges to prevent the said block element to cause obstruction upon lifting of the lower portion of the flap through a cord attached to said hole of the elongated member and extending in the riser pipe section.

8. The drainage valve of claim 1, wherein the said joint sealing means comprises the plate formed with a peripheral groove therein, and a hollow tube made of flexible material and inserted into the said peripheral groove.

9. The drainage valve of claim 8, in which the said groove is generally rectangular in cross section.

10. The drainage valve of claim 8, in which the said hollow tube is made of pure gum rubber.

11. The drainage valve of claim 8, wherein the said plate mounting means comprises spring clips peripherally distributed on a downstream surface of the plate and capable of clamping an annular, inner flange of the said conduit to press the hollow tube between the said groove and the said inner flange.

12. The drainage valve of claim 1, wherein said means for attaching the upper portion of the flap to the upper portion of the plate comprises screw and nut assemblies traversing both the flap and the plate, and washer elements made of rigid material and disposed in respective holes in the flap, each washer element being traversed by a respective screw of said assemblies to prevent crushing of the flexible material of the flap upon tightening of the screw and nut assemblies.

13. The drainage valve of claim 12, in which the said flap is slightly thicker than the washer elements.

14. The drainage valve of claim 12, further comprising a block element removably attachable to a pole member and fixed on an upstream surface of the upper portion of the flap to enable installation of the drainage valve through a riser pipe section connected to the water draining conduit, said block element being attached to the upper portion of the flap through the screw and nut assemblies, and said block element having the form of a parallelepiped and comprising rounded edges to prevent the said block element to cause obstruction upon lifting of the lower portion of the flap through a cord attached to the said lower flap portion and extending in the riser pipe section.

15. The drainage valve of claim 12, wherein the said attaching means comprises sealing washer means associated to the screw and nut assemblies to make the drainage valve impervious to water.

16. The drainage valve of claim 1, further comprising a block element removably attachable to a pole member and fixed on an upstream surface of the upper portion of the flap to enable installation of the drainage valve through a riser pipe section connected to the water draining conduit, said block element having the form of a parallelepiped and comprising rounded edges to prevent said block element to cause obstruction upon lifting of the lower portion of the flap through a cord attached to said lower portion and extending in the riser pipe section.

17. The drainage valve of claim 1, in which the said plate mounting means comprises spring clips peripherally distributed on a downstream surface of the plate and capable of clamping an annular, inner flange of the said conduit.

* * * * *